Aug. 19, 1930.  J. N. STRAUSS  1,773,207
SHOCK ABSORBER
Filed April 8, 1927   3 Sheets-Sheet 2
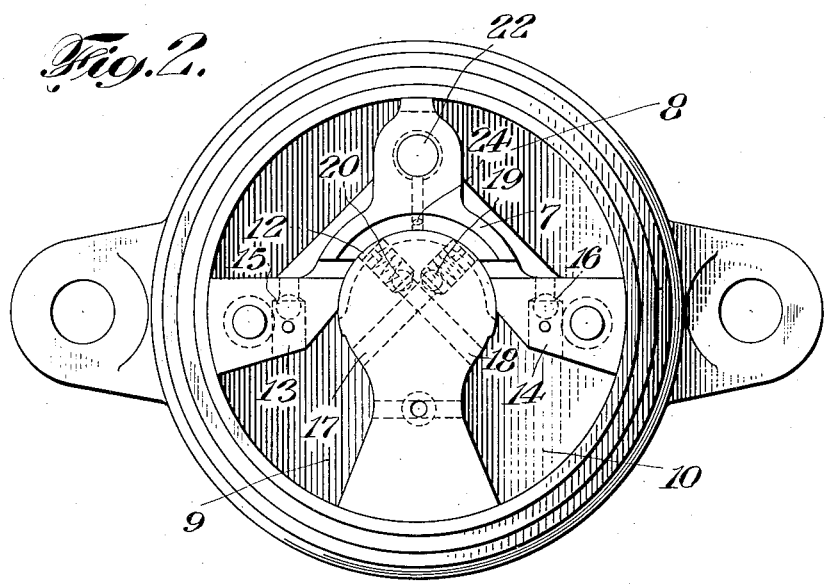
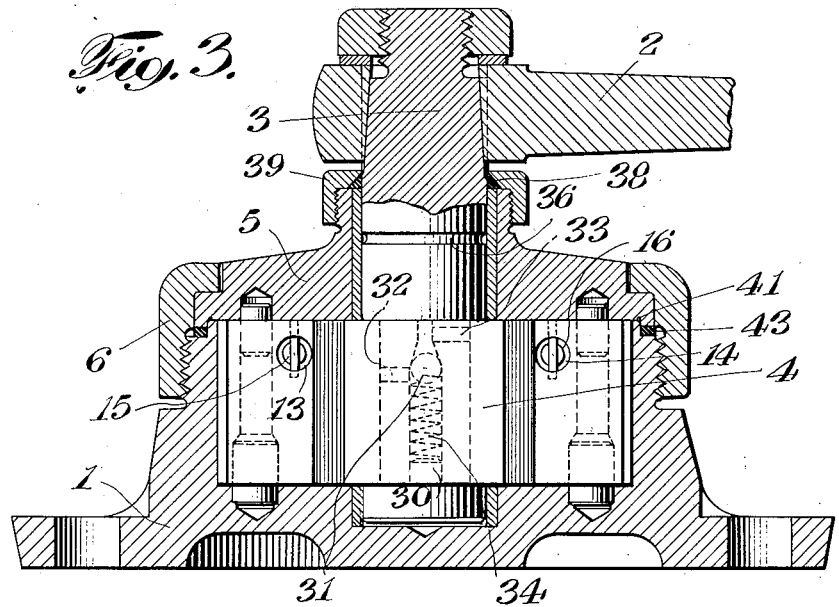
Inventor
John N. Strauss
By Emery, Booth, Janney & Varney
Attorneys Aug. 19, 1930.  J. N. STRAUSS  1,773,207
SHOCK ABSORBER
Filed April 8, 1927   3 Sheets-Sheet 3
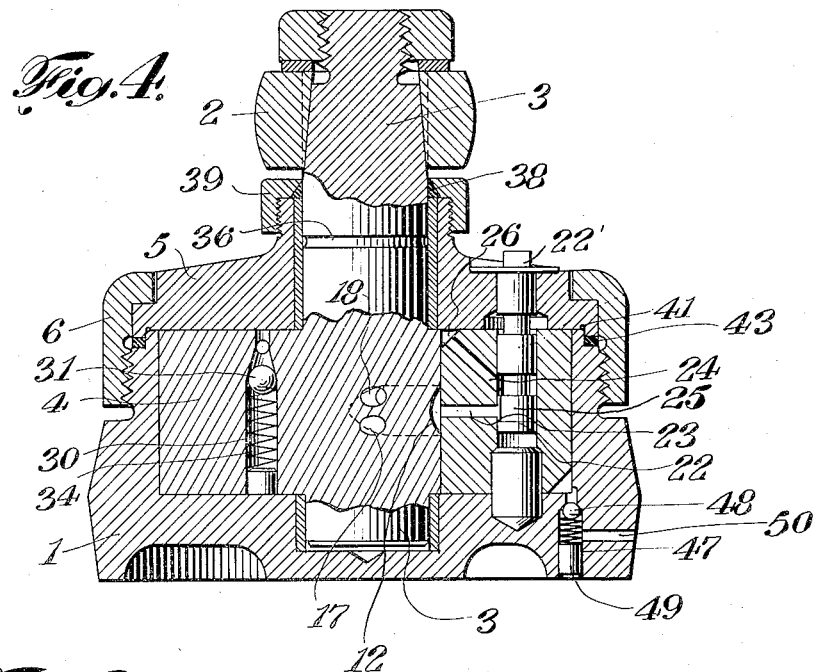
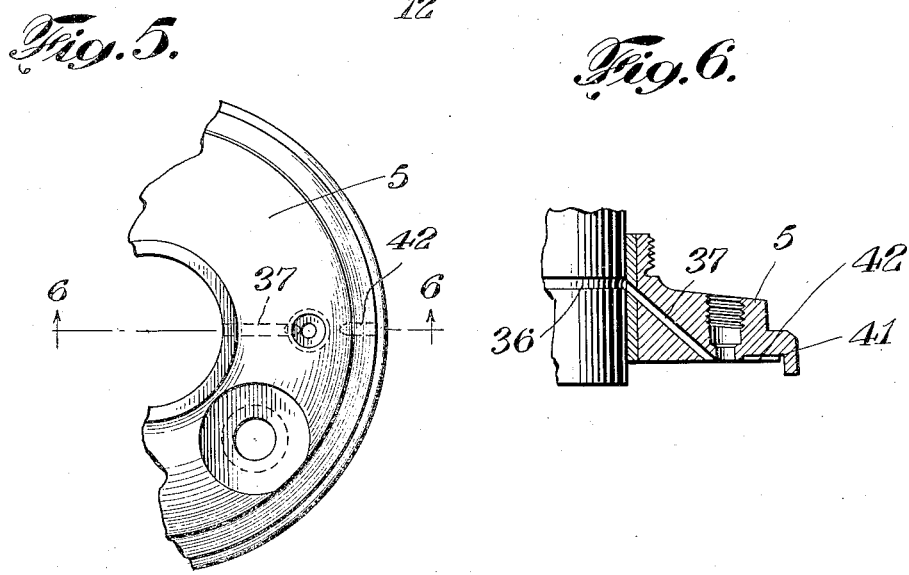

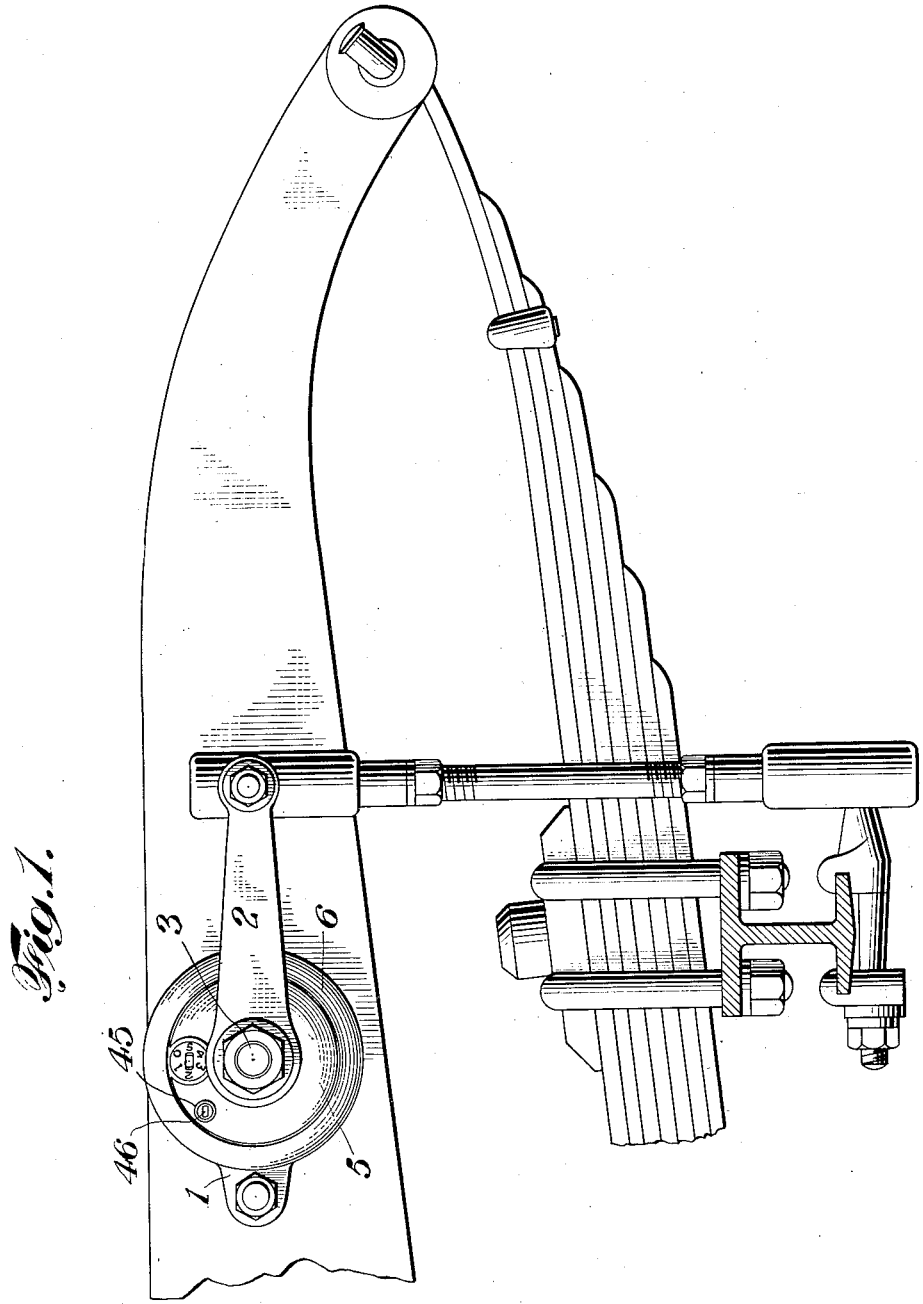

Patented Aug. 19, 1930

1,773,207

UNITED STATES PATENT OFFICE

JOHN N. STRAUSS, OF BUFFALO, NEW YORK, ASSIGNOR TO MORGAN, BLODGETT, MORGAN, INC., OF NEW YORK, N. Y., A CORPORATION OF NEW YORK

SHOCK ABSORBER

Application filed April 8, 1927. Serial No. 181,904.

This invention relates to shock absorbers and has as an object to provide a hydraulic absorber of the double acting type which shall be simple and inexpensive to construct, but which shall be reliable in operation.

Other objects and advantages of the invention will appear hereinafter.

A preferred embodiment of the invention selected for purposes of illustration is shown in the accompanying drawings, in which, Figure 1 is a side elevation showing the absorber connected to the frame and axle of a vehicle.

Figure 2 is a side elevation with the cover removed.

Figures 3 and 4 are horizontal and vertical sectional views respectively.

Figure 5 is a detail view of the cover showing the oil return passages, and

Figure 6 is a section on the line 6—6 of Figure 5.

Referring to the drawings, the absorber is adapted to be connected to two relatively movable vehicle parts such, for example, as the frame and axle, the base 1 of the absorber being preferably bolted to the frame and the movable arm 2 being connected to the axle by means of suitable flexible connections. The arm 2 is preferably splined to the spindle 3, the said spindle carrying a wing piston 4 adapted to oscillate within the interior of the cylindrical chamber formed in the base 1. Mounted over the said cylindrical chamber in a manner to close the same is a cover 5 which is adapted to be secured to the casing by means of the ring 6.

Mounted within the cylindrical chamber and adapted to cooperate with the spindle 3 is a bridge 7 which divides the said cylindrical chamber into two compartments, one of which, designated by the numeral 8, may be called the reservoir chamber and the other of which may be called a pressure chamber. The said pressure chamber, it will be observed, is divided by the piston 4 into two compartments designated by the numerals 9 and 10.

The top of the spindle, opposite the piston 4, has formed therein a groove 12 which connects the chambers 9 and 10 in such manner as to permit substantially free flow of fluid from one chamber to the other when the piston is in the mid position illustrated in the drawings and for a limited distance on each side of mid position. Thus when the piston is caused to move due to relative movements between the body and axle of the vehicle, so long as substantially free flow of fluid results from one pressure compartment to the other through the groove 12, such motion of the vehicle parts is relatively unrestricted. As soon as the piston is moved sufficiently, however, to cause the end of the groove 12 to pass the end wall of the bridge 7, the flow of fluid proceeds in a different manner as will be explained hereinafter.

Passes 13 and 14 are formed in the bridge 7 and check valves 15 and 16 are located therein in a manner to permit flow of fluid from the reservoir 8 to the compartments 9 and 10 but to prevent flow of fluid in the reverse direction.

Passages 17 and 18 are also formed in the spindle 3 and connect the chambers 9 and 10 respectively with the groove 12 previously described. Each of the passages 17 and 18 has a spring pressed check valve 19 or 20 mounted therein which permits flow of fluid from the compartments 9 and 10 to the groove 12 but prevents flow of fluid in the reverse direction.

An adjusting stem 22 is mounted in the upper part of the bridge 7 in a manner to control the flow of fluid through the passages 23 and 24 which are formed therein. By adjusting the cam face 25 by means of the head 22' which extends through the cover 5, the rate of flow of fluid through the passages 23 and 24 may be adjusted to any desired amount. The passage 23 is in communication with the groove 12 in the spindle and receives fluid from said groove, which, under certain conditions, is caused to pass the cam face 25 and through the passage 24 and into the reservoir 8 through the chamfer 26.

From the foregoing it will be apparent that when the movements communicated to the piston 4 by the vehicle parts are relatively slight, free flow of fluid is permitted through the groove 12 from one pressure chamber to another and little or no resistance is interposed to such movements. On the other hand, when a more violent movement of the vehicle parts occurs, as when the wheels pass over a substantial bump or obstruction, the piston 4 is caused to move to the right a considerable distance. The check valve 16 closes immediately and flow of fluid from one pressure compartment through the groove 12 is prevented as soon as the end of the groove passes the end wall of the bridge 7. Accordingly, fluid is caused to flow through the passage 18 and past the valve 20 into the groove 12 from which it may flow to the chamber 9. After the obstruction is passed the vehicle springs tend to expand to return the parts to normal position. Accordingly, the piston 4 is moved toward the left, thus trapping the fluid contained in the compartment 9. The only egress permitted the said fluid is through the groove 12, through the passage 23, past the cam face 25 and through the passage 24 to the reservoir chamber. Inasmuch as flow of fluid through these passages is constricted, the return movement of the vehicle parts to normal position is retarded until such time as the piston 4 arrives at its central position when free flow of fluid from one pressure compartment to another through the groove 12 is again permitted. During movement of the piston toward normal position, fluid is permitted to flow freely from the reservoir through the passage 14 to the chamber 10.

Conversely, if instead of a bump, a hole or depression is encountered, the piston moves to the left from its normal central position and free flow of fluid results from the compartment 9 through the passage 17 to the groove 12 and thence to the compartment 10. Similarly, upon return movement of the vehicle parts to normal position the fluid is caused to flow through the constricted passages and the return movement is thus retarded.

Under certain conditions, as where a hole or depression in the road is immediately followed by a bump, it is desirable to relieve the extraordinary pressures which develop in order to prevent the transmission of the extraordinary forces to the body of the vehicle and also in order to prevent serious damage to the absorber. Consequently, an auxiliary passage 30 is provided, preferably in the piston itself in which is mounted the spring pressed valve 31, the passage 30 communicating with the compartments 9 and 10 through the passages 32 and 33 respectively. The tension of the spring 34 is preferably so adjusted that the valve 31 opens to permit flow of fluid from the compartment 10 to the compartment 9 only in those cases where extraordinary pressures are developed, remaining closed when ordinary road inequalities are encountered.

In order to prevent leakage of the fluid between the spindle 3 and the cover 5, a groove 36 is formed in the spindle which communicates with a return passage 37 formed in the cover and leading to the reservoir chamber. Thus any fluid which is forced along the piston is received in the groove and returned to the reservoir, thus relieving the pressure thereon. The packing 38 which is held in place by the packing nut 39 serves to prevent leakage of any fluid which may flow past the groove 36.

Similarly, in order to prevent leakage of the fluid between the cover 5 and the base 1, an annular groove 41 may be formed in the cover which communicates with the groove 42 leading to the reservoir. Thus any fluid which is forced between the cover and the base flows through the groove 41 to the groove 42 and thence to the reservoir chamber. The packing 43 prevents leakage of any other fluid.

It will be observed that the passage 24 is inclined downwardly for connection with the chamfer 26. In this manner the fluid which is ejected under pressure is directed downwardly into the body of oil in the reservoir and tendencies to form froth or foam are minimized.

A fill hole 45 is provided in the cover 5 which is normally closed by the threaded plug 46. When it is desired to fill the absorber a pressure lubricator may be attached to the threads of the fill hole and fluid may be forced into the reservoir chamber. In order to permit escape of air from the chamber, the passage 47 is provided in the base 1, the said passage containing a spring pressed valve 48 which is held in place by the plug 49. Communicating with the passage 47 back of the valve is a small vent 50 which permits the escape of air as the absorber is filled. It will also be observed that the said escape opening will permit the escape of air or fluid when the fluid is expanded due to changes in temperature. Inasmuch as the escape opening communicates with the reservoir chamber, there is no tendency for fluid to be forced through the opening except when the absorber is filled too full or when the fluid increases in volume due to expansion.

It will be understood that the invention may be variously modified and embodied within the scope of the subjoined claims.

I claim as my invention:

1. In a fluid shock absorber adapted for connection to relatively movable vehicle parts, a casing, a piston, a fixed partition, said piston and partition dividing the interior of said casing into three chambers, one of which is of fixed volume, and the other two of which are of variable volume in response to movement of said piston caused by relative movement of said vehicle parts, means whereby relative movement of said vehicle parts in either direction away from normal rest position causes free and unrestricted flow of fluid directly from one of said variable volume chambers to the other, and means whereby return movement of said vehicle parts toward normal position causes restricted flow of fluid from one of said variable volume chambers to the other through said chamber of fixed volume.

2. In a fluid shock absorber adapted for connection to relatively movable vehicle parts, a casing, a piston, a fixed partition, said piston and partition dividing the interior of said casing into three chambers, one of which is of fixed volume, and the other two of which are of variable volume in response to movement of said piston caused by relative movement of said vehicle parts, and means whereby movement of said piston in either direction away from normal rest position causes free and unrestricted flow of fluid directly from one said variable volume chambers to the other, and means whereby return movement of said piston toward normal position causes restricted flow of fluid from one of said variable volume chambers to the other through said chamber of fixed volume.

3. In a fluid shock absorber adapted for connection to relatively movable vehicle parts, a casing, a single wing piston, a fixed partition, said piston and partition dividing the interior of said casing into three chambers, one of which is of fixed volume, and the other two of which are of variable volume in response to movement of said piston caused by relative movement of said vehicle parts, and means whereby movement of said piston in either direction away from normal rest position causes free and unrestricted flow of fluid directly from one of said variable volume chambers to the other, and means whereby return movement of said piston toward normal position causes restricted flow of fluid from one of said variable volume chambers to the other through said chamber of fixed volume.

4. In a fluid shock absorber adapted for connection to relatively movable vehicle parts, a casing, a piston, a fixed partition, said piston and partition dividing the interior of said casing into three chambers, one of which is of fixed volume, and the other two of which are of variable volume in response to movement of said piston caused by relative movement of said vehicle parts, means providing two passages connecting said chambers of variable volume adapted to permit free and unrestricted flow of fluid directly from one of said variable volume chambers to the other upon movement of said piston in either direction away from normal rest position, and means to prevent flow of fluid through either of said passages upon return movement of said piston toward normal rest position.

5. In a fluid shock absorber adapted for connection to relatively movable vehicle parts, a casing, a piston, a fixed partition, said piston and partition dividing the interior of said casing into three chambers, one of which is of fixed volume, and the other two of which are of variable volume in response to movement of said piston caused by relative movement of said vehicle parts, means providing two passages connecting said chambers of variable volume adapted to permit free and unrestricted flow of fluid directly from one of said variable volume chambers to the other upon movement of said piston in either direction away from normal rest position, means to prevent flow of fluid through either of said passages upon return movement of said piston toward normal rest position, and means providing a passage connecting said variable volume chambers through said chamber of fixed volume and providing restricted flow of fluid between said chambers upon return movement of said piston toward normal rest position.

6. In a fluid shock absorber adapted for connection to relatively movable vehicle parts, a casing, a piston, means cooperating with said piston to divide the interior of said casing into three chambers, means whereby relative motion of said vehicle parts in either direction away from normal rest position acting on said piston causes free and unrestricted flow of fluid directly from one of said chambers to another without passing through said third chamber, and means whereby relative motion of said vehicle parts toward normal rest position causes restricted flow of fluid from one of said chambers to another through said third chamber.

7. In a fluid shock absorber adapted for connection to relatively movable vehicle parts, a casing, a piston, and means cooperating with said piston to divide the interior of said casing into three chambers, and means whereby relative motion of said vehicle parts in either direction away from normal rest position acting on said piston causes free and unrestricted flow of fluid directly from one of said chambers to another without passing through said third chamber.

8. In a fluid shock absorber adapted for connection to relatively movable vehicle parts, a casing, a piston, a fixed partition cooperating with said piston to divide the interior of said casing into a reservoir chamber and two pressure chambers, means whereby motion of said piston in either direction away from normal rest position causes free and unrestricted flow of fluid directly from one pressure chamber to the other, and means whereby return movement of said piston toward normal rest position causes restricted flow of fluid from one of said pressure chambers to said reservoir chamber and substantially free and unrestricted flow of fluid from said reservoir chamber to the other of said pressure chambers.

9. In a fluid shock absorber adapted for connection to relatively movable vehicle parts, a casing, a partition dividing the interior of said casing into reservoir and pressure chambers, a wing piston in said casing dividing said pressure chamber into two compartments, a groove in said piston adapted to permit flow of fluid between said piston and partition from one of said compartments to another, means providing additional passages connecting each of said compartments with said groove, and means in said partition providing a restricted passage from said groove to said reservoir chamber.

10. In a fluid shock absorber adapted for connection to relatively movable vehicle parts, a casing, a partition dividing the interior of said casing into reservoir and pressure chambers, a wing piston in said casing dividing said pressure chamber into two compartments, a groove in said piston adapted to permit flow of fluid between said piston and partition from one of said compartments to another, means providing additional passages connecting each of said compartments with said groove, means in said partition providing a restricted passage from said groove to said reservoir chamber, and means adapted to be adjusted from the exterior of the casing for varying the capacity of said restricted passage.

11. In a fluid shock absorber adapted for connection to relatively movable vehicle parts, a casing, a partition dividing the interior of said casing into reservoir and pressure chambers, a wing piston in said casing dividing said pressure chamber into two compartments, a groove in said piston adapted to permit flow of fluid between said piston and partition from one of said compartments to another, means providing additional passages connecting each of said compartments with said groove means in said partition providing a restricted passage from said groove to said reservoir chamber, and means to permit flow of fluid from said reservoir, and means to permit flow of fluid from said reservoir chamber to said compartment but to prevent flow of fluid in the opposite direction.

12. In a fluid shock absorber adapted for connection to relatively movable vehicle parts, a casing, a partition dividing the interior of said casing into reservoir and pressure chambers, a wing piston in said casing dividing said pressure chamber into two compartments, and means providing a passage of variable capacity from each of said compartments to said reservoir chamber.

13. In a fluid shock absorber adapted for connection to relatively movable vehicle parts, a casing, a partition dividing the interior of said casing into reservoir and pressure chambers, a wing piston in said casing dividing said pressure chamber into two compartments, means providing a passage of variable capacity from each of said compartments to said reservoir chamber, means providing a substantially unrestricted passage from said reservoir chamber to each of said compartments, and check valves in said passages preventing flow of fluid from said compartments to said reservoir chamber.

14. In a fluid shock absorber adapted for connection to relatively movable vehicle parts, a casing a partition dividing the interior of said casing into reservoir and pressure chambers, a wing piston in said casing dividing said pressure chamber into two compartments, means providing a restricted passage from each of said compartments to said reservoir chamber, and means for varying the capacity of said restricted passage.

In testimony whereof, I have signed my name to this specification this 25th day of March, 1927.

JOHN N. STRAUSS.